Figure 1:
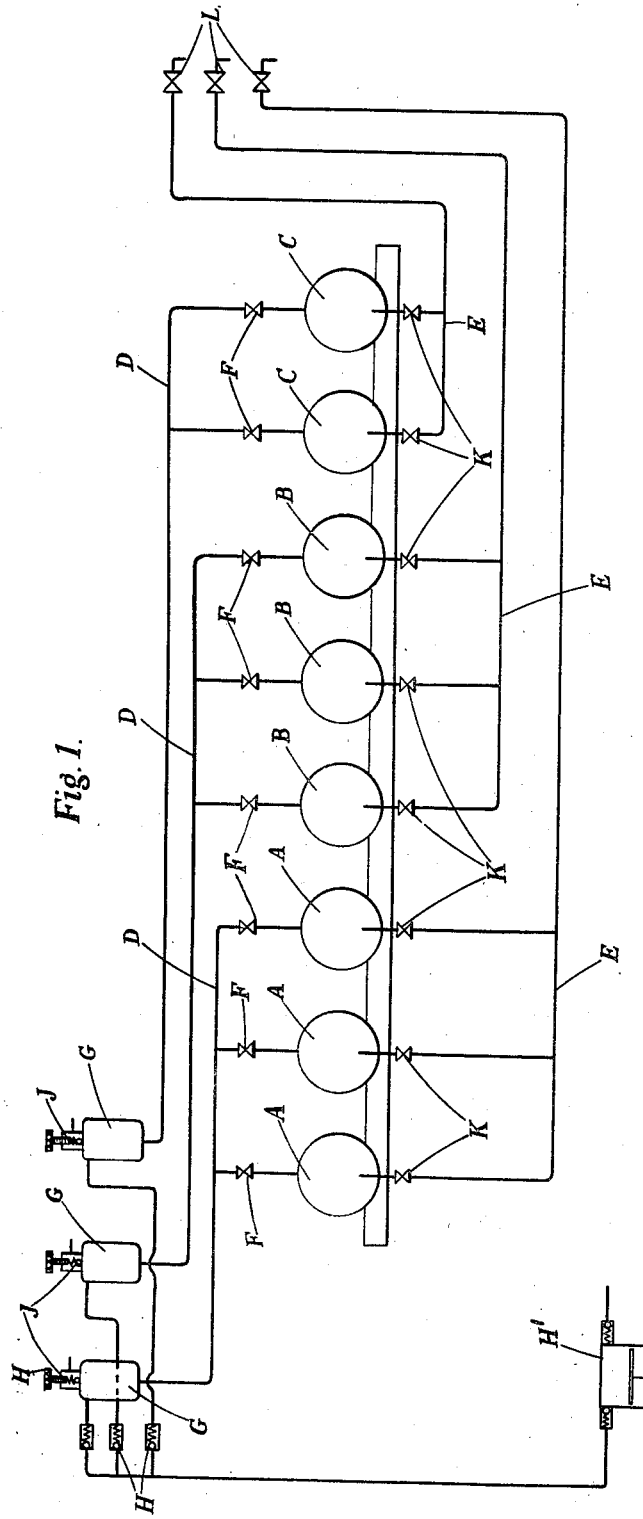

Patented Sept. 17, 1940

2,215,386

UNITED STATES PATENT OFFICE 2,215,386

DISPENSING OF BEER

Kenneth Arnold Bownass, Windermere, and Albert George Thomas Cole, Keswick, England Application February 26, 1938, Serial No. 192,850
In Great Britain March 1, 1937

1 Claim. (Cl. 225—17)

This invention relates to the dispensing of beer and like liquids such as stout, porter and ale. The term "beer" used herein is intended to cover all such liquids, whilst the term "cask" as used herein is intended to cover any container in which such liquids are supplied in bulk. Such liquids can be supplied on draught either by means of a suction pump which draws the beer from the cask and delivers it through the faucet or by the application of gas pressure, such as that of air or carbon dioxide, to the beer in the cask so as to force it through the delivery pipe to the faucet which will be controlled by a suitable cock. The object of the present invention is to provide an improved arrangement of apparatus.

An apparatus for dispensing beer according to the invention comprises two or more casks, a gas manifold for placing the upper parts of the casks in communication with each other, and a gas reservoir connected to the manifold to receive beer gas through the manifold from a cask of fresh beer, for example beer which is being conditioned, and subsequently deliver it back to the same or a different cask to refresh and/or deliver the beer therein.

Preferably the manifold is connected to the reservoir at or near the bottom of the latter.

Conveniently means is provided for supplying air to the manifold through the gas reservoir to displace beer gas passing from the reservoir back through the manifold into a cask. Preferably the air is supplied to the top of the reservoir.

Thus as the beer gas is heavier than air it will tend to remain in the lower part of the reservoir and be delivered first to the casks. In one form of the invention the air is supplied under pressure and the beer is delivered by the pressure of the air and beer gas. In an alternative form the air is admitted at substantially atmospheric pressure and the beer is delivered by a pump. The apparatus may comprise two or more sets of casks each set having its individual gas manifold and gas reservoir, and a source of compressed air common to all the sets of casks and communicating with the manifolds in such manner that air can enter any of the reservoirs but beer gas cannot pass from one to another.

The normal procedure when beer is to be dispensed on draught, according to known methods, is first to condition the beer by allowing the gas to escape. For this purpose, when a full cask is first put on stillage and before the supply of air under pressure is connected up to deliver the beer to the bar as it may be required, a porous or soft spile is inserted into it which allows the gas slowly to escape. This remains until all the gas has been allowed to escape, which may occupy for example, two days. With such a process it is found that by the time the cask has become nearly empty the beer in it will often have become flat and consequently a considerable quantity of beer is generally wasted quite apart from the small quantity which cannot be used since it contains sediment.

In the arrangement according to the present invention, the admission of beer gas restores the quality of the flat beer and may even render it indistinguishable from the fresh beer.

Figure 2:
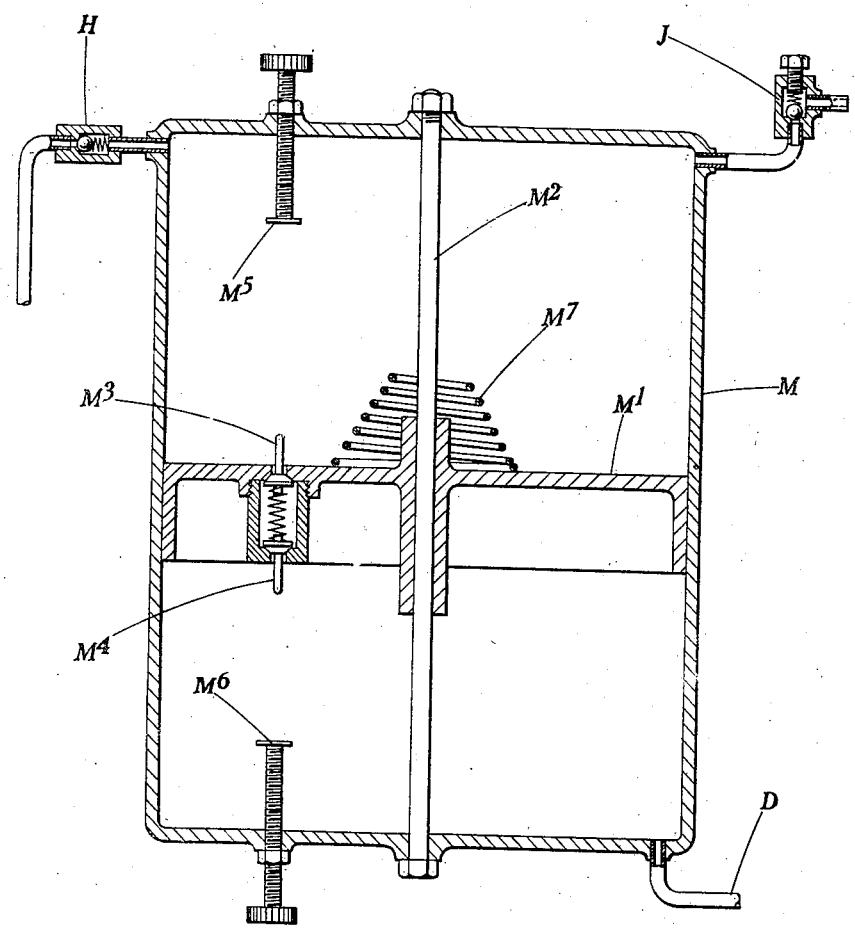
Figure 3:
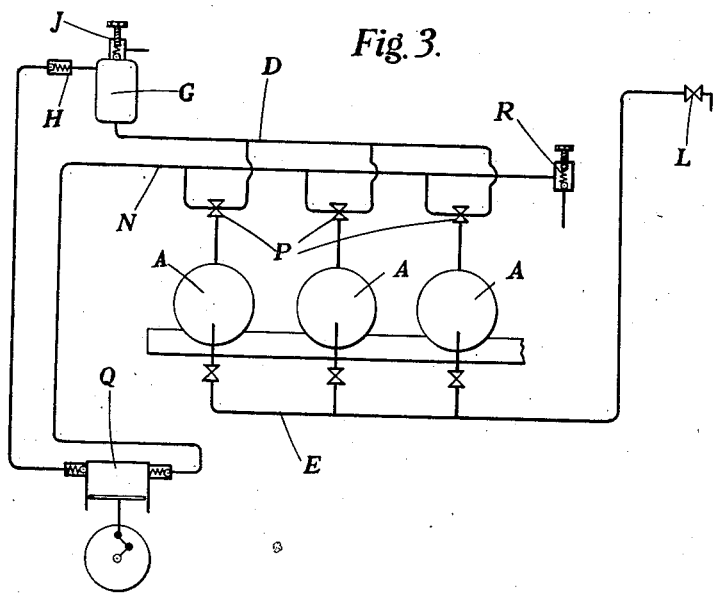
Figure 4:
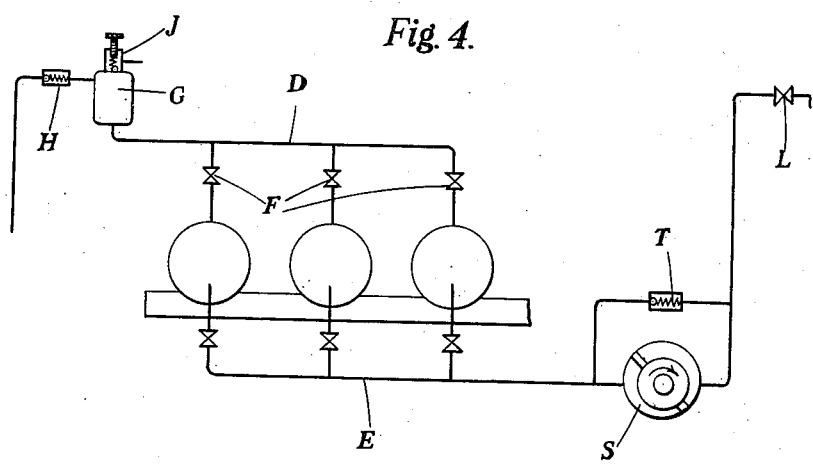

The invention may be carried into effect in various ways and certain specific arrangements will be described by way of example with reference to the accompanying drawings, in which Figure 1 is a diagram of one arrangement of casks, Figure 2 is a diagrammatic sectional view of one form of gas reservoir, Figure 3 is a diagram of a portion of a modified arrangement, and Figure 4 is a diagram of a portion of a further modified arrangement.

In the arrangement indicated in Figure 1 a gantry of customary construction is provided to support as many casks as may be required. These are divided into sets of casks, each set being intended to supply a particular grade of beer. For example, one set might comprise six or eight casks of bitter whilst another for a brand of beer less in demand, for example stout, would comprise two or three. In general there would be at least three sets of casks, the total number of casks depending on the number of brands of beer to be dispensed and the quantity required. Figure 1 shows a set of three casks A, a set of three casks B, and a set of two casks C.

Each set of casks is provided with a gas manifold D and a delivery manifold E. The gas manifold consists of a pipe running along the line of casks above them and provided with branches each having a tap valve F and a flexible pipe leading to a vent or spile tap adapted to be driven or screwed into the bung so as to communicate with the upper part of a cask. Each manifold communicates with a reservoir G for air or gas under pressure, and the reservoirs in turn communicate through individual non-return valves H with a source $H^1$ of air under pressure which may be common to all the manifolds. Mechanical compressors suited for the purpose and provided with devices to stop them automatically when an adequate pressure is reached are well known. Each reservoir is also provided with a spring-loaded safety valve J which is preferably adjustable so as to permit escape of gas when the pressure exceeds a predetermined value. It will thus be appreciated that whilst the non-return valves H prevent any beer gas from passing from a cask into the air supply common to the various sets of casks, and therefore prevents beer gas from passing from one set of casks into another, none the less if the valves F of the individual casks are open, beer gas can pass from one cask to another of the same set.

Each delivery manifold consists of a pipe running along the row of casks near the cantles and at a slightly lower level. The pipe is provided with a number of branches each having in it a cock K and a flexible connecting pipe adapted to connect it to the tap on the cask. Thus, beer may be delivered at will from any one or more of the casks by opening corresponding cocks. It will be understood that the delivery manifolds of the various sets of casks are quite separate and lead to separate outlet faucets L each controlled by its appropriate cock at the bar.

The apparatus described may be used in various ways but the following procedure is preferred. If the beer does not have to be raised from a cellar a comparatively low pressure in the air supply will be sufficient, for example 3 to 5 pounds per square inch may be used. On the other hand, the pressure of the beer gas in a full cask of which the contents have not been conditioned may be as much as 30 pounds per square inch. As mentioned above, it is preferred not to allow the gas to escape from a full cask by using a soft spile but to make use of this gas to refresh and deliver beer from a nearly empty cask.

Thus, assuming the beer in one cask is nearly finished and is tending to become somewhat flat, the cock on its air branch is opened and at the same time the cock on the air branch of a fresh cask is also opened, whilst the delivery valve on the fresh cask is kept closed. This allows the beer gas from the full cask to issue into the gas manifold and pass into the old cask and, provided the pressure of the beer gas is in excess of the air pressure, the non-return valve H will remain closed and unless air is required for some other set of casks the compressor will remain idle.

The beer gas from the fresh cask is found to have the effect of greatly improving the beer in the old cask so that practically the whole of the latter can be sold and only a fraction is wasted of the amount that would normally be wasted. For example, whereas it might normally be necessary to throw away a gallon from a 36-gallon cask, it may now be possible to use all except a pint which contains sediment and therefore cannot be sold. Apart, however, from the saving of beer which would previously have been in such bad condition that it could not be sold, the invention enables the beer that is sold to be maintained in better condition so that the whole contents of the cask are delivered in as good condition as the portion first drawn from it.

When as much as possible of the beer in the old cask has been delivered, its delivery valve will be shut off and that of the new cask will be opened. The empty cask will be removed and a fresh cask put in its place, a spile tap being driven into it whilst the outlet tap is connected up to the delivery. The spile tap will then be opened to connect this cask to the manifold to assist in maintaining the pressure of beer gas therein.

For the delivery of a considerable proportion of the beer it may be unnecessary to supply air to the reservoir since the pressure of beer gas evolved from the beer both in the cask from which delivery is taking place and in other casks will be sufficient. It will be appreciated that gas continues to be evolved from the beer for a considerable time and even after all the gas has been released, if the cask is then closed for the night a pressure of some 10 pounds per square inch may have developed by next morning. When, however, the pressure of the beer gas is less than that of the air the non-return valve will open and the air from the compressor will pass into the gas manifold and deliver the beer.

In practice, with some grades of beer the air compressor may seldom or never be called into operation, for example it may start up perhaps once a week.

The manner of delivery has been described in connection with two casks only but it will be appreciated that it is equally applicable to a number of casks and can be appropriately modified as desired.

The apparatus described enables empty casks to be very readily disconnected and removed and fresh casks to be put in their place and connected up. The actual pipe connections may be of any preferred form.

In the arrangement described in connection with Figure 1 a quantity of beer gas is stored in the reservoir G of each set of casks and can be drawn upon when the pressure falls. It is found that the condition of the beer delivered is considerably better when, in accordance with the invention, the beer is delivered by the pressure of beer gas than when it is delivered by air pressure or the pressure of carbon dioxide. The use of air in contact with the beer tends to make it become flat whilst the use of carbon dioxide tends to make it unduly gassy. So long as the air compressor remains inoperative the beer in the arrangement shown is delivered exclusively under the pressure of its own natural gas. Moreover when the compressor begins to operate, the beer will initially at all events still be delivered by the pressure of the beer gas stored in the reservoir G. If the compressor continues to operate, this beer gas will be to an increasing extent mixed with air.

In some instances it may be desirable to provide a form of reservoir from which the beer gas is delivered back into the gas manifold without admixture with air. For this purpose the reservoir may be constructed in any suitable manner.

For example, it may be provided with a piston which is loaded by the pressure of air from a compressor. Such a construction is shown diagrammatically in Figure 2 in which the reservoir comprises an outer cylinder M within which a piston $M^1$ slides on a guide $M^2$. As in the arrangement of Figure 1 the gas manifold D communicates with the lower part of the cylinder whilst the upper part communicates through a non-return valve H with the compressor and is provided with a spring-loaded relief valve J. Thus when a fresh cask is put in communication with the gas manifold and the pressure therein rises, the piston $M^1$ will be forced upwardly and will drive air out of the upper part of the reservoir through the relief valve J. On the other hand when the pressure in the manifold falls the piston will be forced downwardly by the air pressure above it, further air being supplied by the compressor when the air pressure falls below a predetermined value.

In order to maintain the pressure in the gas manifold if the supply of beer gas in the reservoir is insufficient and is all used up, a pair of non-return valves $M^3$ and $M^4$ may be provided in the piston and cooperate with stationary abutments $M^5$ and $M^6$ which open one or other of them when the piston reaches one or other end of its travel. Thus, as the pressure in the gas manifold falls the piston will travel downwardly until the valve $M^4$ engages and is opened by the abutment $M^6$. The valve $M^3$ can then be opened by the air pressure and allow air to flow through the piston into the lower part of the reservoir and so into the gas manifold. Similarly as the pressure in the gas manifold rises when a fresh cask is put in communication with it the piston can move upwardly, forcing the air out through the relief valve J until the valve $M^3$ engages and is opened by the abutment $M^5$. This will permit beer gas to pass through the valves $M^4$ and $M^3$ and out through the relief valve J or, if air has previously passed through the piston to its under side, such air can be driven out enabling the whole of the lower part of the reservoir to be filled with beer gas. The abutment $M^6$ may be made adjustable so as to open the valve $M^4$ at an appropriate point in the movement of the piston. For example, it may be desirable that this valve should open while there is still a substantial quantity of beer gas in the reservoir so that instead of air being suddenly admitted to the cask a gas is admitted which consists of a gradually increasing proportion of air.

Moreover if it is desired to store the maximum quantity of beer gas and it is permissible to do so at a pressure somewhat higher than that to which the relief valve J is set, a spring $M^7$ may be provided on the piston which engages the top of the reservoir before the piston reaches the end of its stroke. Thus before the valve $M^3$ is opened the pressure on the underside of the piston will have to exceed that on its upper side by an amount corresponding to the force exerted by the spring. The extent of compression of the spring necessary to open the valve $M^3$ can be varied by adjusting the abutment $M^5$.

Thus, for example, if the compressor were set to come into operation at 4 pounds per square inch and the relief valve J were set to open at 5 pounds per square inch, the effect of the spring $M^7$ might be to prevent actual waste of beer gas until the whole reservoir was filled with it to a pressure of 7 or 8 pounds per square inch. Obviously it would be possible to set the relief valve J to this pressure but the use of the spring $M^7$ has the advantage that until the piston is in its uppermost position the pressure in the manifold is retained more nearly uniform so that substantial fluctuation of pressure occurs comparatively gradually and comparatively seldom.

It will be appreciated that when all the beer has been delivered from a cask the cask is still full of beer gas possibly at a pressure of 4 or 5 pounds per square inch. In some instances it may be desirable to utilise this beer gas to renew and deliver beer from another cask. An arrangement for this purpose is indicated in Figure 3 which shows only the set of casks A of Figure 1. In this case in addition to the gas manifold D there is provided a suction manifold N and the simple air valves F are replaced by two-way valves P enabling the upper part of each cask to be shut off or connected alternatively to the gas manifold or the suction manifold. The suction manifold is connected to the intake of a suitable compressor Q and in addition is provided with an adjustable spring-pressed suction valve R which permits air to be drawn into the suction manifold when the pressure therein drops below a predetermined figure.

The arrangement shown in Figure 3 operates in the same way as that described in connection with Figure 1 or Figure 2, but in this case if an empty cask containing beer gas is on the gantry and the state of the beer in the other casks of the set is such that the compressor may be called into operation, the empty cask can be put in communication with the suction manifold so that when the compressor operates it will deliver the beer under beer gas pressure instead of under air pressure.

In the modified arrangement indicated in Figure 4, the use of air or other gas under pressure is dispensed with and a rotary pump or the like is provided in each delivery pipe to cause the beer to flow when necessary. The apparatus is in general similar to that described above and each set of casks is provided with its gas manifold D and its delivery manifold E. In this case, however, each gas manifold simply serves to place the casks in communication with one another and the non-return valve H simply allows air to be drawn into it if the pressure in it becomes less than atmospheric. Each delivery manifold is provided with a rotary pump S by which the beer is pumped to the delivery faucet when necessary. The pump is automatically controlled in accordance with the pressure on its delivery side so as to start up when the pressure becomes insufficient, or electrically through the tap on the faucet or tap unit. It is moreover provided with a non-return by-pass valve T enabling beer to flow by it when the pressure on its inlet side exceeds that on its delivery side.

Thus, as in the arrangement first described, whenever the pressure of the beer gas of a fresh cask is sufficient it is usesd to deliver the beer remaining in a nearly empty cask during which time the pump remains idle and the beer passes through the non-return by-pass valve T. The same thing happens whenever the beer in the fresh cask is delivered by the pressure of its own gas. It is only if this falls below a predetermined value, that the drop of pressure may cause the pump to start up in order to maintain the delivery. Finally, if the gas from a fresh cask is admitted to deliver what remains of the beer in the nearly empty cask the rise of pressure will again stop the pump, the delivery taking place through the non-return by-pass valve.

What we claim as our invention and desire to secure by Letters Patent is:

Apparatus for dispensing beer comprising at least two sets of casks, a gas manifold for each set of casks by which the upper parts of the casks of that set can be put in communication with each other, a beer gas reservoir for each set of casks connected to the corresponding gas manifold to receive beer gas from a full cask and subsequently deliver such gas to a cask of that set of casks, a common source of gaseous medium under pressure, and a non-return valve for each reservoir through which it communicates with the source of gaseous medium under pressure so that gaseous medium can pass from the supply into any cask but beer gas from one cask can only flow into another cask of the same set.

KENNETH ARNOLD BOWNASS.
ALBERT GEORGE THOMAS COLE.